United States Patent Office 3,433,641
Patented Mar. 18, 1969

3,433,641
ANIMAL FEEDS CONTAINING PHTHALAZINONE DERIVATIVES AS GROWTH PROMOTERS
Alfred Margot, Basel, Switzerland, assignor to Geigy Chemical Corporation, Greenburgh, N.Y., a corporation of Delaware
No Drawing. Filed Apr. 16, 1965, Ser. No. 448,877
Claims priority, application Switzerland, Apr. 22, 1964, 5,192/64
U.S. Cl. 99—2
Int. Cl. A23k 1/00
6 Claims

ABSTRACT OF THE DISCLOSURE

Phthalazinone derivatives of the formula

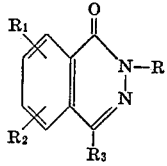

in which R is hydrogen, lower alkyl, the group

($R_4$ being alkoxy or alkenyloxy), or the group

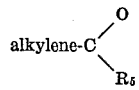

(alkylene having 1 to 3 carbon atoms and $R_5$ being amino, lower alkyl amino, di-lower alkyl amino, or the group OX wherein X is hydrogen or the non-toxic cation of a base); $R_1$ and $R_2$ independently are hydrogen, halogen, nitro or lower alkyl; and $R_3$ is lower alkyl, halogen or the group OY wherein Y is hydrogen or the non-toxic cation of a base. These derivatives are useful as growth-promoting additives for animal feeds.

---

The present invention concerns new additives to animal feeds which contain phthalazinone derivatives, as well as a process for the production of these additives.

It is generally known that by adding vitamins, antibiotics, mixtures of mineral salts, amino acids, hormone preparations, etc. to feeds for farm and domestic animals, better health and, in certain cases, an increased rate of growth can be attained. Some feed additives effect a better utilization by the warm blooded organism of the feed given. However, as animal feeds containing such additives are generally administered over longer periods of time, harmful effects are to be feared, in particular, with regard to the prolonged use of antibiotics and hormones.

It has now been found that phthalazinone derivatives of the formula

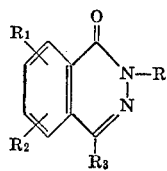

(I)

wherein R represents hydrogen, a lower alkyl radical or the group

or

alkylene having from 1 to 3 carbon atoms, and in which $R_4$ is an alkoxy or alkenyloxy group, and $R_5$ is the amino, lower alkylamino or di-lower alkylamine group or the group —OX wherein X represents hydrogen or a cation of an inorganic or organic base, which cation is non-toxic to the warm blooded organism, $R_1$ and $R_2$ independently each represent hydrogen, a halogen atom, the nitro group or a lower alkyl radical, $R_3$ represents a lower alkyl radical, a halogen atom or the group —OY wherein Y is hydrogen or a cation of an inorganic or organic base, which cation is non-toxic to warm blooded animals, have growth-promoting properties and are excellently suitable as additives for the usual animal feeds. They are excellently tolerated by the animal organism so that feed additives containing such phthalazinone derivative are adavntageous for the feeding of farm and domestic animals such as pigs, cattle, sheep, goats, horses, dogs, rodents, animals raised for their fur, fowls, etc.

Methyl, ethyl, propyl and butyl radicals, for example, are meant by lower alkyl radicals represented by R, $R_1$, $R_2$ and $R_3$ in Formula I. Alkoxy or alkenyloxy groups $R_4$ are, e.g. the methoxy, ethoxy, n-propoxy, isopropoxy, allyloxy and methallyloxy group. As alkyl radicals in the alkylamino and dialkylamino groups represented by $R_4$, those having 1 to 4 carbon atoms are used, such as those given for R, $R_1$ and $R_3$.

Examples of cations X and Y are salt-forming metal and ammonium ions such as ions of alkaline and alkaline earth metals, of ammonia, also ammonium ions of alkylamines such as trimethylamine, methyldiethylamine, triethylamine, of hydroxyalkylamines such as triethanolamine, as well as ions of N-alkyl piperidines.

The phthalazinone derivatives of Formula I are crystalline, stable, and they dissolve well in the organic solvents which are non-toxic to the organism. Their salts have very good water solubility. These compounds can be produced by known methods, for example according to "The Chemistry of Heterocyclic Compounds: Condensed Pyridazine and Pyrazine Rings" by J. C. E. Simpson (1953), pp. 69–200.

The feed additives according to the present invention can be in the form of powders, suspensions or emulsions, solutions or so-called premixes (feed concentrates), and can be admixed as such with the usual feeds. The active substances of Formula I however, can also be added directly to the animal feed. For example, the water soluble salts can be added to the milk which is given to calves.

Powders are produced by either bringing the active substances in the form of their solutions (in water or in organic solvents suitable for the organism) on to suitable carriers such as hydrocarbons, cellulose powder, proteins, soya bean meal, cotton seed meal, linseed meal, gelatin, carbowaxes, sodium chloride, calcium phosphate, kaolin, talcum, bentonite, etc. or by intimately mixing them with such carriers. Suspensions and emulsions are obtained by mixing, blending or milling the active substances of Formula I with solid or liquid carriers suitable for feeding animals, also dispersing agents such as sorbitan monoleate. This concentrate, which for practical reason contains not more than about 50–80% by weight of active substance of Formula I can be diluted with solid and liquid feeds to any concentration desired but not below 0.01% by weight. In addition, the active substances of Formula I are made into solutions for which purpose advantageously water, ethanol and/or vegetable oils are used as solvents.

Such concentrates can also be mixed with suitable amounts of other additives, e.g., with mineral salts, vitamins, antioxidants, strong protein extracts, antibiotics, chemotherapeutica, bacteriostatica, fungistatica, coccidiostatica, hormone preparations, tranquilizers, substances having an anabolic action, also with preparations which promote growth or which influence the quality of the meat of farm animals. Thus, for example, feed additive concentrates are produced which contain 1 to 50%, and preferably 5 to 10% of active substance, whereas the finished feed advantageously contains the active substances of Formula I in a concentration of, e.g. 0.01 to 0.03%.

The following examples illustrate the production of feed additives or feed concentrates as well as tests made therewith on chickens, young pigs and calves. Parts and percentages are given therein by weight unless expressly stated otherwise.

Example 1

50 parts of 2 - methyl - 5 - chloro-4-hydroxy-1(2H)-phthalazinone, 0.8 part of sodium benzoate, 2 parts of tylose, 5 parts of sorbitan monooleate and 42.2 parts of white flour are intimately mixed to form a feed additive. A 50% feed concentrate is obtained which can be mixed to any concentration desired with water, milk, etc.

Example 2

10 parts of 2 - (isopropoxycarbonyl) - 4-chloro-1(2H)-phthalazinone are mixed to form a feed additive with 90 parts of a feed concentrate consisting of

| | | |
|---|---|---|
| Roughage | percent | 4.5 |
| Crude protein | do | 18.5 |
| Digestible protein | do | 15.7 |
| Total nutrients | do | 66.5 |
| Vitamin A | I.U./kg | 9000 |
| Vitamin $D_3$ | I.U./kg | 1200 |
| Vitamin $B_2$ | mg./kg | 6 |

It can be administered to domestic animals as such or diluted as desired.

Example 3

4-chloro-1(2H)-phthalazinone as active substance is added to the commercial feed concentrate defined below, in an amount of 300 mg. per kg. and the feed so prepared is given to two week old chickens three times daily. After 4 weeks, the chickens gained more weight and there was an improved feed efficiency compared with chickens which received a control feed that did not contain any active substance.

The feed concentrate had the following composition:

| | Kg. |
|---|---|
| Cereals | 76 |
| Vegetable protein carriers | 11 |
| Animal protein carriers | 10 |
| Bone meal | 1.2 |
| Quartz grit | 0.3 |
| Mineral salts | 1.3 |
| Trace elements (Co, Fe, Mg, Mn) | 0.1 |
| Vitamin concentrate (9000 I.U. vit. A, 1800 I.U. vit. D) | 0.1 |

Example 4

The sodium salt of 2-methyl-4-hydroxy-1(2H)-phthalazinone is mixed with dextrin or sugar to form a 20% concentrate. 1 g. of this mixture dissolved in 1 liter of full cream milk was given to 10 to 20 day old calves once daily over a period of 4 weeks. The calves fed in this way with 50 mg. active substance per liter milk showed a better increase in weight than those which received no additive with the milk.

Example 5

2-isopropyl-4-hydroxy-1(2H)-phthalazinone is rubbed into a previously sieved food of the composition:

| | | |
|---|---|---|
| Roughage | percent | 4–6 |
| Crude protein | do | 18–20 |
| Total nutrient | do | 67–70 |
| Vitamin A | I.U./kg | 4000 |
| Vitamin $D_3$ | I.U./kg | 600 | to form a 5% concentrate. Portions of this mixture were mixed with a usual commercial pigmeal and given to little piglets so that each animal at each feed received 100 mg. of active substance per kg. of pigmeal.

The groups of test animals, 5 piglets in each, showed greater increase in weight than the control animals.

Example 6

A group of 15 pigs were fed, per animal and per day, with 7 litres of buttermilk (5–6% dry substance) and 1–2 kg. of a dry mixed feed of the following composition:

| | Kg. |
|---|---|
| Barley | 56 |
| Maize | 9 |
| Milo | 9 |
| Wheat/rye | 8 |
| Bran | 10 |
| Hay meal | 4 |
| Dried potato | 10 |
| Mineral substances and vitamins | 2 | to which was added, per animal and per day, 100 mg. of 2-methyl-4-hydroxy-1(2H)-phthalazinone. The increase in weight was compared with that of an equal sized control group fed with the same feed but without active substance.

| | With active substance added (kg.) | Control group (kg.) |
|---|---|---|
| Average initial weight | 39.8 | 41.2 |
| Average weight after 30 days | 54.3 | 51.0 |
| Increase in weight | 14.5 | 9.8 |

Example 7

A poultry feed of the following composition is prepared:

| | G. |
|---|---|
| Basic feed: | |
| Semolina | 220 |
| Coarsely ground maize | 220 |
| Coarsely ground barley | 80 |
| Groats | 60 |
| Suet | 50 |
| Codfish meal | 100 |
| Fish meal | 30 |
| Skimmed milk powder | 20 |
| Soya cake | 100 |
| Sunflower cake | 70 |
| Peanut cake | 30 |
| Bone meal | 5 |
| Calcium carbonate | 10 |
| Sodium chloride | 3 |
| Milled sand | 2 |
| | 1000 |

The following additives were added to this basic feed per kilogramme:

| | |
|---|---|
| Lysine mg__ | 500 |
| Bacitracin zinc salt mg__ | 20 |
| Nitrofurazone mg__ | 125 |
| Trace elements: | |
| Fe mg__ | 10 |
| Cu mg__ | 1 |
| Mn mg__ | 50 |
| I mg__ | 1.5 |
| Zn mg__ | 8 |
| Vitamin $B_1$ mg__ | 1.5 |
| Vitamin $B_2$ mg__ | 4 |
| Vitamin $B_6$ mg__ | 2 |
| Vitamin $B_{12}$ mg__ | 10 |
| Nicotinic acid mg__ | 10 |
| Choline mg__ | 25 |
| Pantothenic acid mg__ | 10 |
| Folic acid mg__ | 0.5 |
| | 778.5 |
| Vitamin A I.U__ | 12,000 |
| Vitamin $D_3$ I.U__ | 1,000 |
| Vitamin E I.U__ | 10 |

300 mg. of 2-methyl-4-hydroxy-1(2H)-phthalazinone were then added per kg. to the above feed mixture and a group of white leghorn chickens of an initial weight of about 250 g. were fed with the mixture obtained for 6 weeks. Compared with a control group over the same period, the average increase in weight was about 7%.

Particularly advantageous results are also attained with feed additives of the same composition as those of Examples 1 to 7, but in lieu of the active substances used therein, an equivalent amount of one of the following:

(8) 4-hydroxy-1(2H)-phthalazinone,
(9) 2-methyl-4-bromo-1(2H)-phthalazinone,
(10) sodium salt of 2-methyl-4-hydroxy-1(2H)-phthalazinone,
(11) 4-methyl-1(2H)-phthalazinone,
(12) 4-hydroxy-5-chloro-1(2H)-phthalazinone,
(13) 4-hydroxy-5-nitro-1(2H)-phthalazinone,
(14) 2-ethyl-4-hydroxy-6,7-dimethyl-1(2H)-phthalazinone,
(15) 2-carbomethoxy-4-chloro-1(2H)-phthalazinone,
(16) 2-carboethoxy-4-chloro-1(2H)-phthalazinone,
(17) 2-butoxycarbonyl-4-chloro-1(2H)-phthalazinone,
(18) 2-n-propoxycarbonyl-4-chloro-1(2H)-phthalazinone,
(19) 2-allyloxycarbonyl-4-chloro-1(2H)-phthalazinone,
(20) 2-carbamylmethyl-4-chloro-1(2H)-phthalazinone,
(21) 2-β-(N,N-dimethyl-carbamyl)-ethyl-4-chloro-1(2H)-phthalazinone,
(22) 2-chloro-1(2H)-phthalazinone,
(23) 2-(N-ethyl-carbamyl)-methyl-4-chloro-1(2H)-phthalazinone,
(24) 2-carboxymethyl-4-chloro-1(2H)-phthalazinone,
(25) the sodium salt of 2-carboxymethyl-4-chloro-1(2H)-phthalazinone,
(26) the ammonium salt of 2-carboxymethyl-4-chloro-1(2H)-phthalazinone,
(27) the trimethyl-ammonium salt of 2-carboxymethyl-4-chloro-1(2H)-phthalazinone,
(28) tri-β-hydroxyethyl-ammonium salt of 2-carboxymethyl-4-chloro-1(2H)-phthalazinone,
(29) the N-methylpiperidinium salt of 2-carboxymethyl-4-chloro-1(2H)-phthalazinone.

I claim:
1. An animal feed composition comprising
 (a) animal feed constituents in sufficient amount to be effective in the nutrition of warm-blooded animals and
 (b) phthalazinone of the formula

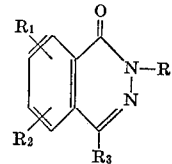

wherein

R represents a member selected from the group consisting of hydrogen, lower alkyl, the group

and the group

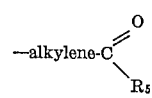

the alkylene bridge in the last member having from 1 to 2 carbon atoms, wherein $R_4$ is a member selected from the group consisting of lower alkoxy, lower alkenyloxy, and $R_5$ represents a member selected from the group consisting of amino, lower alkylamino, di-lower alkylamino, and the group —OX wherein X is a member selected from the group consisting of hydrogen and a cation of a base, which cation is non-toxic to warm blooded animals, each of $R_1$ and $R_2$ independently represents a member selected from the group consisting of hydrogen, chlorine, nitro and lower alkyl, and $R_3$ represents a member selected from the group consisting of lower alkyl, chlorine, bromine and the group —OY wherein Y is a member selected from the group consisting of hydrogen and a cation of a base, which cation is non-toxic to warm blooded animals, said phthalazinone being present in said feed composition in a concentration of at least 0.01% based on the weight of the composition, thereby imparting growth-promoting activity to the latter.

2. An animal feed compositoin as defined in claim 1, wherein the phthalazinone is 2-methyl-4-hydroxy-1(2H)-phthalazinone.

3. An animal feed composition as defined in claim 1, wherein the phthalazinone is the sodium salt of 2-methyl-4-hydroxy-1(2H)-phthalazinone.

4. An animal feed composition as defined in claim 1, wherein the phthalazinone is 2-(isopropoxycarbonyl)-4-chloro-1(2H)-phthalazinone.

5. An animal feed composition as defined in claim 1, wherein the phthalazinone is 4-chloro-1(2H)-phthalazinone.

6. An animal feed composition as defined in claim 1, wherein the phthalazinone is 2 - methyl - 4 - hydroxy - 6-chloro-1(2H)-phthalazinone.

References Cited

FOREIGN PATENTS 1,055,718 1/1967 Great Britain.
1,064,303 4/1967 Great Britain.

RAYMOND N. JONES, *Primary Examiner.*

H. H. KLARE III, *Assistant Examiner.*

U.S. Cl. X.R.

99—4; 260—250; 424—250